United States Patent [19]

Yoshinaga et al.

[11] 4,368,947

[45] Jan. 18, 1983

[54] TURRET CONDENSER FOR MICROSCOPES

[75] Inventors: Makoto Yoshinaga; Yutaka Takabayashi, both of Hachiouji, Japan

[73] Assignee: Olympus Optical Co., Ltd., Tokyo, Japan

[21] Appl. No.: 205,504

[22] Filed: Nov. 10, 1980

[30] Foreign Application Priority Data

Nov. 13, 1979 [JP] Japan ............... 54-146835

[51] Int. Cl.³ ............................................. G02B 21/14
[52] U.S. Cl. ..................................... 350/509; 350/526
[58] Field of Search ................... 350/13, 17, 87, 88, 350/89, 91, 39, 254, 315

[56] References Cited

U.S. PATENT DOCUMENTS

| | | | |
|---|---|---|---|
| 2,264,835 | 12/1941 | Flint | 350/87 |
| 2,427,689 | 9/1947 | Osterberg et al. | 350/87 X |
| 2,565,419 | 8/1951 | Aitcheson | 350/13 X |
| 3,161,717 | 12/1964 | Barabás et al. | 350/87 |
| 3,679,287 | 7/1972 | Takahashi et al. | 350/87 |
| 3,930,712 | 1/1976 | Boughton et al. | |
| 4,136,927 | 1/1979 | Lisfeld | 350/87 |
| 4,166,671 | 9/1979 | Lisfeld et al. | 350/87 |

FOREIGN PATENT DOCUMENTS 288204  5/1953  Switzerland ............... 350/315

Primary Examiner—John K. Corbin
Assistant Examiner—Matthew W. Koren
Attorney, Agent, or Firm—Cushman, Darby & Cushman

[57] ABSTRACT

A turret condenser for microscopes comprising a turret, an aperture stop, a stop ring for opening and stopping down the aperture stop, a cam fixed to the turret, a lever means having one end in contact with the cam and the other end having a through hole formed therein, and a spring having one end fixed to the stop ring and the other end carrying a retaining piece fixed thereto, the spring passing through the through hole formed in the lever means, the turret condenser for microscopes being arranged so that the stop ring always keeps the stop fully opened by means of the force of the spring when the turret is in the position of phase contrast microscopy.

3 Claims, 5 Drawing Figures

TURRET CONDENSER FOR MICROSCOPES

BACKGROUND OF THE INVENTION (a) Field of the Invention

The present invention relates to a turret condenser for microscopes and, more particularly, to an improved turret condenser for microscopes.

(b) Description of the Prior Art

Known turret condenser which enable to perform phase contrast microscopy comprise a turret and an aperture stop, which operates independently of the turret. The turret has a hole for ordinary microscopy and ring slits for phase contrast microscopy (generally, the turret is provided with different kinds of ring slits suitable for different objectives). At the time of ordinary microscopy, the hole of turret is arranged at the position of optical axis of the condenser and the aperture diameter of aperture stop is adjusted to a suitable value. At the time of phase contrast microscopy, the ring slit suitable for the objective to be used for observation is brought to the position of optical axis by rotating the turret. At the time of phase contrast microscopy, the aperture stop is not necessary and, therefore, it is kept fully opened.

When performing phase contrast microscopy after performing ordinary microscopy using the above-mentioned turret condenser, it is sometimes overlooked to fully open the aperture stop, which was stopped down at the time of ordinary microscopy, before performing phase contrast miroscopy. If phase contrast microscopy is performed without fully opening the aperture stop beforehand, the brightness of field decreases and it becomes inconvenient for observation. As a result, incorrect judgement may be sometimes caused at the time of observation. As the aperture stop does not appear in the field of view, there is such tendency to overlook the fact that the aperture stop is not fully opened and, therefore, the above-mentioned misoperation occurs very frequently.

SUMMARY OF THE INVENTION

It is, therefore, a primary object of the present invention to provide a turret condenser so arranged that the aperture stop is always kept in the fully opened state when the turret is brought to the position where the ring slit comes to the position of optical axis.

DETAILED DESCRIPTION OF THE PREFERRED EMBODIMENT

Figure 1:
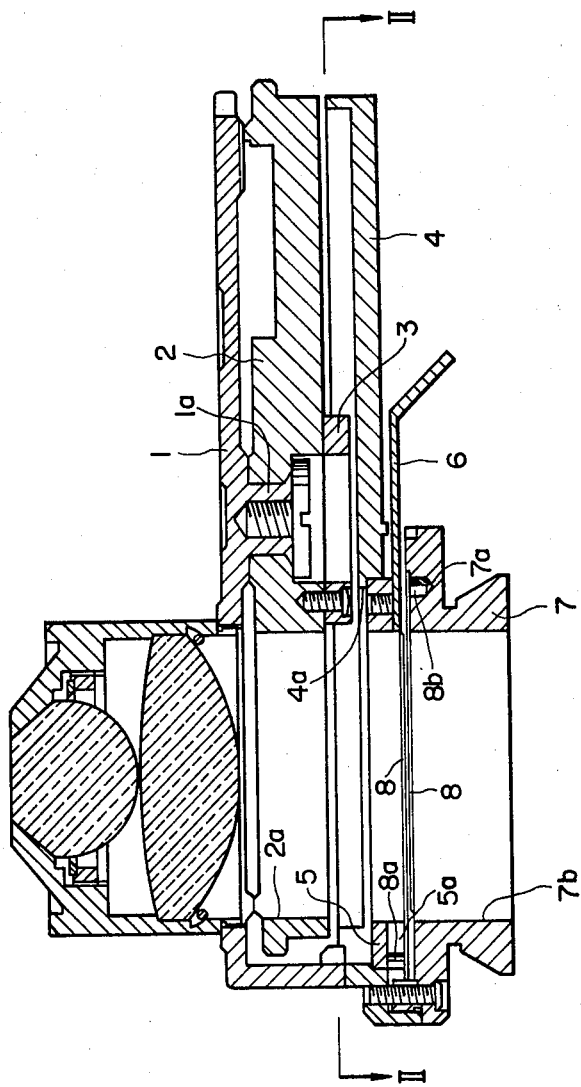
FIG. 1 shows sectional view of an embodiment of the turret condenser for miroscopes according to the present invention.
Figure 2:
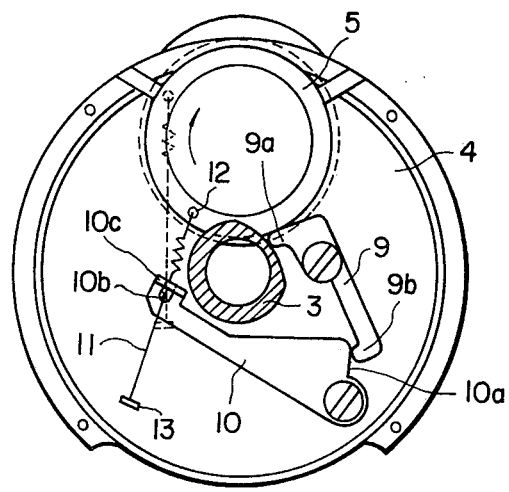
FIG. 2 shows a sectional view taken along the line II—II in FIG. 1.
Figure 3:
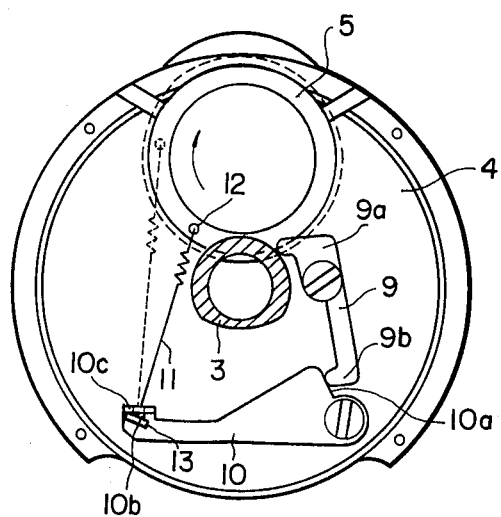
FIG. 3 shows a sectional view similar to FIG. 2 but illustrating the state that the position of turret is varied from the position shown in FIG. 2.
Figure 4:
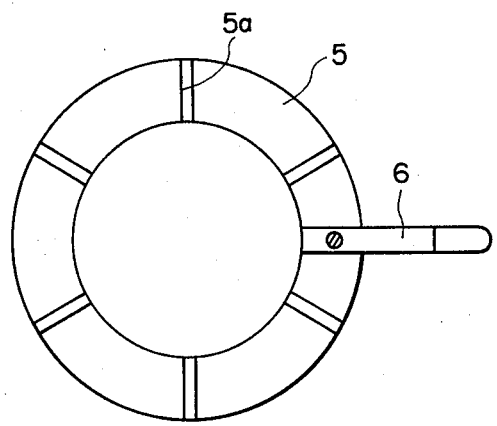
FIG. 4 shows a bottom view of stop ring constituting the above-mentioned embodiment.
Figure 5:
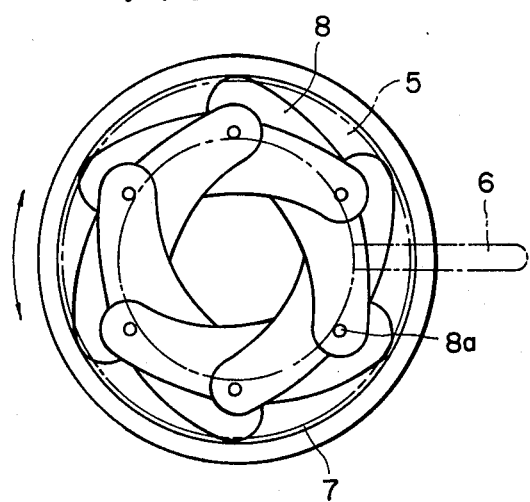
FIG. 5 shows a plan view illustrating the state that the diaphargm blades of aperture stop are mounted to the top surface of dovetail of the above-mentioned embodiment.

Now, the turret condenser according to the present invention is described in detail referring to the embodiment shown on the accompanying drawings. In FIG. 1, numeral 1 designates a condenser body and numeral 2 designates a turret, which is rotatably fitted to the lower surface of condenser body 1 so that the turret 2 is rotatable round a shaft 1a. The turret 2 has a hole 2a and ring slits which are not shown. Numeral 3 designates a cam fixed to the central portion of bottom surface of turret 2 and having a predetermined shape (shape as shown in FIGS. 2 and 3). Numeral 4 designates a cover fixed to the lower portion of condenser body 1 and having an opening 4a. Numeral 5 designates a stop ring rotatably fitted to a predetermined position (position of opening 4a) of cover 4 and having radial grooves 5a on the bottom surface thereof as shown in FIG. 4, the number of the radial grooves 5a being equal to the number of stop blades to be described later. Numeral 6 designates a handle provided to the stop ring 5. Numeral 7 designates a dovetail fixed to the lower part of cover 4 and having an opening 7b. At the top of dovetail 7, holes 7a are provided and the number of those holes 7a are equal to the number of stop blades to be described later. Numeral 8 designates stop blades provided between the stop ring 5 and dovetail 7. The stop blades 8 are respectively provided with downwardly extended pins 8b, which are fixed thereto and rotatably fitted into the holes 7a of dovetail 7, and upwardly extended pins 8a, which are fixed thereto and slidably fitted into the grooves 5a of stop ring 5. Therefore, when the stop ring 5 is rotated clockwise or counterclockwise by operating the handle 6, the stop is stopped down or opened. Numeral 9 designates a first lever pivotably mounted to the upper surface of cover 4 and having one end 9a thereof kept in contact with the cam 3. The first lever 9 is in the counterclockwise rotated position when its one end 9a is in contact with the shorter radius portion of cam 3 and is in the clockwise rotated position when its one end 9a is in contact with the longer radius portion of cam 3. Numeral 10 designates a second lever pivotably mounted to the upper surface of cover 4 and having one side portion 10a which is kept in contact with the other end 9b of the first lever 9, the second lever 10 being thereby arranged so that it is rotated always in the direction opposite to the rotating direction of the first lever 9. The second lever 10 has a hole 10b and upwardly bent portion 10c at its one end. Numeral 11 designates a spring passing through the hole 10b of the second lever 10 and having one end mounted to a screw 12, which is provided to the stop ring 5. At the other end of spring 11, a retaining piece 13 is fixed. By selecting the length of spring 11 adequately, the spring 11 is arranged to function as described below. That is, when the second lever 10 is in the clockwise rotated position shown in FIG. 2, the retaining piece 13 does not reach the upwardly bent portion 10c of the second lever 10 (as shown by a broken line in FIG. 2) even when the stop ring 5 is rotated in the direction shown by the arrowhead in FIG. 2 and, consequently, the spring 11 is not expanded at all and is kept in the slackened state. When the second lever 10 is in the counterclockwise rotated position shown in FIG. 3, the retaining piece 13 is engaged with the upwardly bent portion 10c of the second lever 10 and, consequently, the spring 11 is in the slightly expanded state. Therefore, when the second lever 10 is in the position shown in FIG. 3, the spring 11 is further expanded when the stop ring 5 is rotated in the direction shown by the arrowhead.

The operation and function of the turret condenser according to the present invention arranged as described in the above are described below. At first, when the turret 2 is rotated so that the end 9a of the first lever 9 contacts the shorter radius portion of cam 3 as shown in FIG. 2, the first lever 9 comes to the counterclockwise rotated position and, consequently, the second lever 10 comes to the clockwise rotated position. When the stop ring 5 is rotated clockwise, in the above-mentioned state, by operating the handle 6 in order to stop down the stop, the spring 11 remains in the slackened state. Therefore, the force of spring 11 is not applied to the relative positions of stop ring 5 and second lever 10 and, consequently, the stop can be operated freely and it is possible to freely select the aperture diameter of stop. On the other hand, when, the turret 2 is rotated so that the end 9a of the first lever 9 contacts the longer radius position of cam 3 as shown in FIG. 3, the first lever 9 comes to the clockwise rotated position and, consequently, the second lever 10 comes to the counterclockwise rotated position. In this state, the spring 11 is in the slightly expanded state. When, in the above-mentioned state, the stop ring 5 is rotated clockwise by operating the handle 6 in order to stop down the stop, the spring 11 is further expanded and the restoring force of spring 11 is thereby increased. Therefore, when the user's hand is released from the handle 6 in the above-mentioned state, the stop ring 5 is returned to the original position by the spring force. In other words, the stop is kept in the fully opened state. Therefore, when the relative positions of turret 2 and cam 3 are decided so that the center of hole 2a of turret 2 comes to the position where it coincides with the optical axis of illumination system, when the stop is in the state that the stop can be operated freely as shown in FIG. 2, and so that the center of ring slit of turret 2 coincides with the optical axis of illumination system, when the stop is always kept in the fully opened state as shown in FIG. 3, it is possible to freely operate the stop at the time of ordinary microscopy and to keep the stop always in the fully opened state at the time of phase contrast microscopy. As a result, the stop is automatically returned to the fully opened state only by setting the turret 2 to the position of phase contrast microscopy even when the stop was stopped down to a small aperture diameter at the time of previous ordinary microscopy.

As explained in the above, the turret condenser according to the present invention is arranged so that the aperture stop is automatically put to the fully opened state always at the time of phase contrast microscopy, it is possible to prevent overlooking to fully open the aperture stop at the time of phase contrast microscopy and, consequently, the turret condenser according to the present invention enables to always perform proper and correct microscopy.

We claim:

1. In a turret condenser for microscope comprising a condenser lens, an aperture stop means arranged below said condenser lens and aligned with said condenser lens, and a rotatable turret arranged between said condenser lens and aperture stop means and having a hole and a plurality of ring slits capable of being aligned with said condenser lens in turn when said turret is rotated, the improvement comprising a cam having a predetermined shape and secured to said turret to rotate concentrically with said turret, lever means having an end being in contact with said cam and a free end, and a spring passing through said free end of said lever means and having one end connected to said aperture stop means, said free end of said lever means being engaged with the other end of said spring to fully open said aperture stop when one of said plurality of ring slits is aligned with said condenser lens by the rotation of said turret.

2. A turret condenser for microscope according to claim 1 wherein said spring is brought into the slackened state by said lever means to enable the aperture diameter of said aperture stop means to be varied freely when said hole of said turret is aligned with said condenser lens by the rotation of said turret.

3. A turret condenser for microscope according to claim 1 or 2 wherein said lever means comprises a first lever having one end engaged with said cam, and a second lever having one end engaged with the other end of said first lever and the other end through which said spring is passed.

* * * * *